(No Model.)

W. H. FERRIS & J. P. HART.
UNCHECKING DEVICE FOR HARNESS.

No. 546,514. Patented Sept. 17, 1895.

Witnesses:
L. C. Hill
W. S. Vaughan

Inventors
William H. Ferris and
Jno. Percy Hart
by
A. L. Hough
Atty.

UNITED STATES PATENT OFFICE.

WILLIAM HENRY FERRIS AND JOHN PERCY HART, OF BROWNSVILLE, PENNSYLVANIA.

UNCHECKING DEVICE FOR HARNESS.

SPECIFICATION forming part of Letters Patent No. 546,514, dated September 17, 1895.

Application filed July 26, 1895. Serial No. 557,180. (No model.)

*To all whom it may concern:*

Be it known that we, WILLIAM HENRY FERRIS and JOHN PERCY HART, citizens of the United States, residing at Brownsville, in the county of Fayette and State of Pennsylvania, have invented certain new and useful Improvements in Unchecking Devices for Harness; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in harness attachments, and especially to a new and improved device for unchecking a horse when it is desired to allow it to drink, or to lower its head for any other purpose, while the animal is harnessed.

A further object of the invention resides in the provision of a suitable standard held by a suitable shank to the saddle of the harness, the said standard or shell supporting in suitable bearings a shaft which is integral with a flanged wheel, and carrying on each side of the flanged wheel an end of a spring, the other ends of the springs being attached to the inner casing of the shell. The check-hook being held by an elongated shank within a recessed portion of the standard is connected by a steel tape to the circumference of the said flanged wheel, and means for releasing the shank of the said hook are provided, whereby the tape may be fed out when the animal lowers its head, and be automatically withdrawn and locked in its former position after the horse has raised its head.

To these ends and to such others as the invention may pertain, the same consists, further, in the novel construction, combination, and adaptation of the parts, as will be hereinafter more fully described, and then specifically defined in the appended claim.

We clearly illustrate our invention in the accompanying drawings, which, with the letters of reference marked thereon, form a part of this specification, and in which drawings similar letters of reference indicate like parts throughout the several views, in which—

Figure 1:
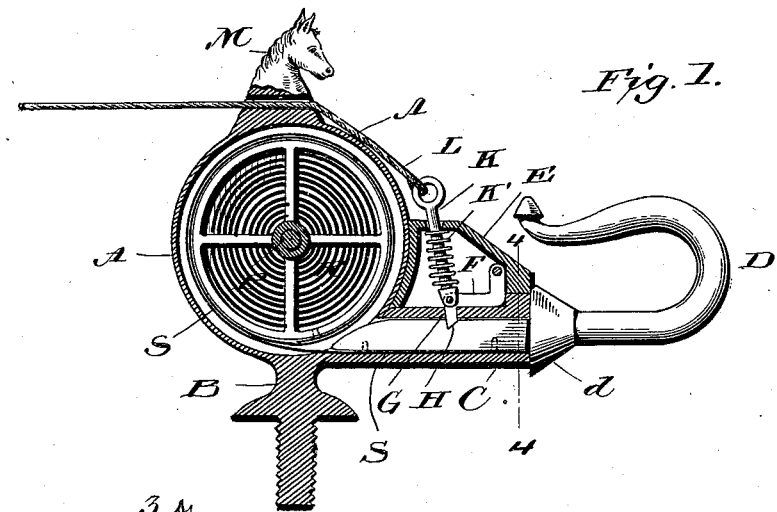
Figure 2:
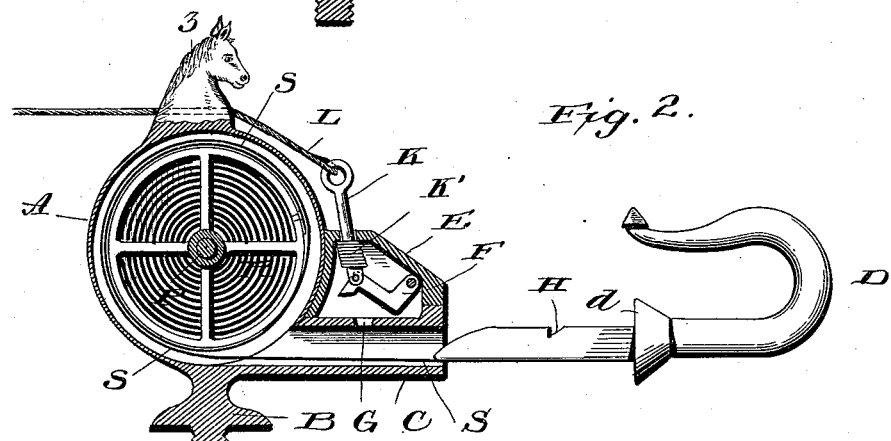
Figure 3:
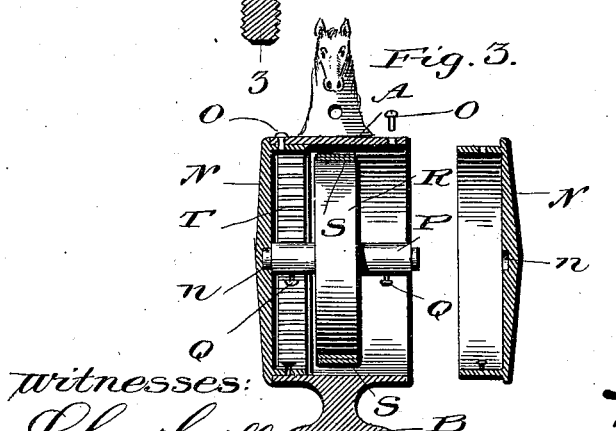
Figure 4:
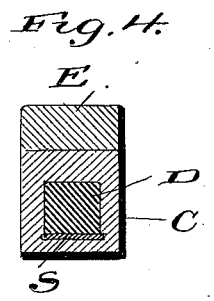

Figure 1 is a vertical section longitudinally through our invention. Fig. 2 is a similar view with the check-hook released from its position shown in Fig. 1. Fig. 3 is a sectional view. Fig. 4 is a section on line 4 4 of Fig. 1.

Reference now being had to the details of the drawings by letter, A designates the shell of the device, which is provided with an integral shank portion B, screw-threaded and designed to enter an aperture of the saddle of a harness.

C is an elongated socket integral with the said shell and designed to receive the shank portion of the check-hook D. The shoulder $d$ of the said hook is adapted to abut against the outer edges of the said socket when the hook is locked in place.

Pivoted within the casting E is the dog F, having one end bent downward and passed through an aperture G, and its free end adapted to rest normally in a notch H in the shank of the check-hook. K is a pin pivoted at its lower end to said dog and carries a coiled spring K' provided to hold the lower end of the said dog in the notch in the check-hook shank, to lock the same in the socket provided therefor. To the upper end of the said pin a cord L is secured, which extends within easy reach of the operator. The said cord is preferably attached to one of the reins, and is passed through the ornamental horse-head M as a guide. To the inner walls of the sides of the said shell, which walls constitute removable caps N, is journaled the shaft P in the recesses $n$. The said shaft has the integral lugs Q, and the wheel R having a somewhat widened flat circumference. The caps to the sides of the shell telescope within the circular or cylindrical shell, and when in place are fastened by small screws O, passed through the shell and into the flanges of the said caps. By this construction the interior of the shell is practically dust and water proof.

S is a steel tape having one end secured to the rear end of the shank of the hook D and its other end secured to the circumference of the wheel R, and T T are two coiled springs, each having an end secured to the said lugs Q and their other ends secured to the inner circumference of the shell.

From the foregoing it will be seen that when the operator pulls on the cord L, when it is desired to allow the horse to lower its head to drink, or for any other purpose, the dog is released from engagement with the said notch, and the hook carrying tape at its shank end is allowed to be withdrawn from the socket, and as the said hook is pulled forward the coiled springs are wound up, and when the horse raises its head the steel tape is wound up on the wheel, and the dog automatically locks the shank of the hook in place.

We are aware that it is common to construct automatically-operated check-hooks, in which a coiled spring is secured to the shank of the check-hook and a pin provided to hold the check-hook in place, and hence we do not make a broad claim for that construction.

What we claim is—

In combination in an unchecking device for harnesses, a shell designed to be held to the saddle of a harness having recesses in its two removable sides to receive the ends of the shaft carrying the wheel R, an integral socket C, the check hook having a shank portion designed to fit in said socket, a steel tape having one end connected to the said shank portion, its other end connected to the circumference of the said wheel, coiled springs T, each having an end fastened to a lug Q on said shaft, and their other ends connected to the inner circumference of the said shell, and means for releasing the check hook, substantially as shown and described.

In testimony whereof we affix our signatures in presence of two witnesses.

WILLIAM HENRY FERRIS.
JNO. PERCY HART.

Witnesses:
T. A. SHARPNACK,
A. J. PERRY.